United States Patent [19]

Kugimiya et al.

[11] Patent Number: 4,860,206

[45] Date of Patent: Aug. 22, 1989

[54] TRANSLATION SYSTEM ALLOWING USER DESIGNATION OF POSTPOSITIONAL WORDS

[75] Inventors: Syuzo Kugimiya; Shinji Tokunaga; Hitoshi Suzuki; Yoji Fukumochi; Shinobu Shiotani; Ichiko Sata, all of Nara, Japan

[73] Assignee: Sharp Kabushiki Kaisha, Osaka, Japan

[21] Appl. No.: 66,548

[22] Filed: Jun. 26, 1987

[30] Foreign Application Priority Data

Jun. 27, 1986 [JP] Japan .................................. 61-152065
Jun. 30, 1986 [JP] Japan .................................. 61-155785

[51] Int. Cl.⁴ .......................................... G06F 15/38
[52] U.S. Cl. .................................... 364/419; 364/900; 434/169; 434/157; 434/167
[58] Field of Search ................ 364/419, 900 MS File; 434/157, 167, 169

[56] References Cited

U.S. PATENT DOCUMENTS

| 4,420,817 | 12/1983 | Yoshida | 364/900 |
| 4,502,128 | 2/1985 | Okajima | 364/900 |
| 4,594,686 | 6/1986 | Yoshida | 364/900 |
| 4,730,270 | 3/1988 | Okajima | 364/900 |

FOREIGN PATENT DOCUMENTS

| 0182229 | 8/1985 | Japan | 364/419 |
| 166676 | 7/1986 | Japan | |
| 158076 | 7/1987 | Japan | |

*Primary Examiner*—Jerry Smith
*Assistant Examiner*—Steven G. Kibby
*Attorney, Agent, or Firm*—Birch, Stewart, Kolasch & Birch

[57] ABSTRACT

A translation system for translating a first language into a second language having at least one user's dictionary into which individual words in the first language desired and equivalent words in the second language can be registered according to user's necessity. This translation system provides means for designating a postpositional word functioning as an auxiliary to a main word such as a verb upon registering the main word in the user's dictionary.

2 Claims, 8 Drawing Sheets

Buffer A — Original Text Buffer (1)

| t | h | i | s |  |  |  |  |
|---|---|---|---|---|---|---|---|
| i | s |   |   |   |   |   |   |
| a |   |   |   |   |   |   |   |
| p | e | n |   |   |   |   |   |
| . |   |   |   |   |   |   |   |

Buffer B — A Part of the Buffer after Conslting Dictionary (2)

| this — — | 代名詞 (Pronoun) | (Demonstrative Adjective) |  |
|---|---|---|---|
| is — — | 動詞 (Verb) |  |  |
| a — — | 冠詞 (Article) |  |  |
| pen — — | 名詞 (Noun) |  |  |

Buffer C — Buffer after Constructional Analysis (3)

Fig. 5

(4) Buffer D  Buffer after Analyzing by Tree Structure (5) Buffer E  Buffer for Outputting the Sentence

これはペンである。

(Kore wa pen de aru.)

| 辞書に無い単語があります。 |
| 単語(品詞.訳語)を入力しますか？　"Yes" ／ "No" |

Fig. 8(b)

```
単語 = _?
品詞 = NOUN
       PRON
       ADJ
       ADV
       VERB
訳語 =
```

Fig. 8(c)

```
単語 =
品詞 = ♦NOUN
       PRON
       ADJ
       ADV
       VERB
訳語 =
```

Fig. 8(d)

```
単語 = meet
品詞 = NOUN
       PRON
       ADJ
       ADV
       ♦VERB
訳語 =
```

Fig. 8(e)

```
単語 = meet
品詞 = NOUN
       PRON
       ADJ
       ADV
       ♦VERB
訳語 = (に)会う
```

Fig. 8(f)

| ユーザ辞書に登録しますか？　"Yes" ／ "No" |

Fig. 9

| I meet you. | 私はあなたに会う。 |

Fig. 10

| I buy it. | 私はそれを買う。 |

Fig. 11

TRANSLATION SYSTEM ALLOWING USER DESIGNATION OF POSTPOSITIONAL WORDS

BACKGROUND OF THE INVENTION

1. Field of the Invention

The present invention is related to a dialogical translation system in which an operator can designate a suitable postpositional word functioning as an auxiliary to a verb and/or an auxiliary verb upon entering the verb or auxiliary verb into a user's dictionary provided for registering special words.

2. Description of the Prior Art

It is well known that there are many significant differences between the Japanese and English languages. One of these differences is postpositional words functioning as an auxiliary to a main word such as a verb in Japanese (hereinafter referred to as "postpositional word").

In conventional translation systems, a constant or predetermined postpositional word is always given to a verb having been registered in the user's dictionary regardless of the meaning thereof where a postpositional word specific to the verb is not registered together with an equivalent word thereof.

Accordingly, substitution of a constant postpositional word may result in an unreasonable translation from an original sentence if the postpositional word used with a verb included in an original sentence is not suitable therefor.

If it is predetermined that a constant postpositional word is given to all verbs upon translating an English sentence into Japanese, the Japanese sentence translated may have one or more unreasonable or unmatched postpositional words. For example, such a case is where the Japanese postpositional word "o" is given to all verbs. In this case, if an English sentence "I meet you" is entered, a Japanese sentence "Watakushi wa anata o au" is obtained. However, this is not correct since another postpositional word "ni" should be given in place of "o".

SUMMARY OF THE INVENTION

Accordingly, an essential object of the present invention is to provide a translation system which is able to give a suitable or proper postpositional word to an individual verb when registered in a user's dictionary.

In order to accomplish the object of the present invention, there is provided, according to the present invention, a translation system for translating a first language into a second language having at least one user's dictionary into which individual words in the first language and corresponding words in the second language can be registered and supplemented by the user to provide a means for designating an appropriate postpositional word functioning as an auxiliary to a main word such as a verb upon registering the main word into the user's dictionary.

BRIEF DESCRIPTION OF THE DRAWINGS

This and other objects and features of the present invention will become apparent from the following description taken in conjunction with the preferred embodiment thereof with reference to the accompanying drawings given by way of illustration only, and thus are not limitative of the present invention and wherein:

FIGS. 5(1), 5(2), 5(3), 5(4) and 5(5) show, respectively, contents of Buffers A to E of the module during the translation process according to the present invention;

DETAILED DESCRIPTION OF THE PREFERRED EMBODIMENTS

Figure 1:
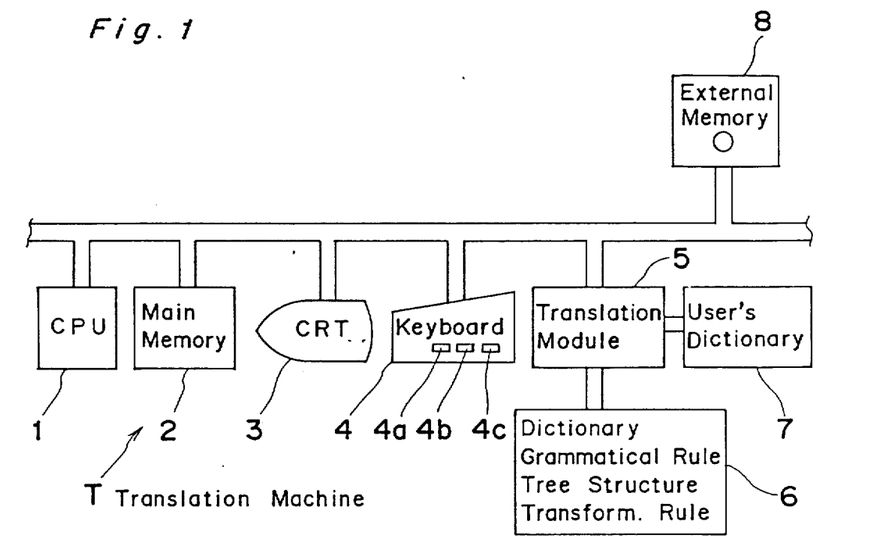
FIG. 1 is a block diagram showing a translation machine according to the present invention.

FIG. 1 shows a block diagram of a translation machine T according to the present invention. The translation machine includes a central processing unit 1 for controlling the translation process and other necessary processes, a main memory 2 for storing programs used to execute the necessary processes, a CRT display 3 for displaying possible translations etc., a keyboard 4 for entering data necessary for translation processing, a translation module 5 for storing data necessary for translation processing, a printer (not shown) and an external memory 8 such as a floppy disk or similar device. On the keyboard 4, there are particularly provided a RETURN key 4a and bracket keys 4b, 4c [ ] with other keys normally on a translation device keyboard.

Figure 2:
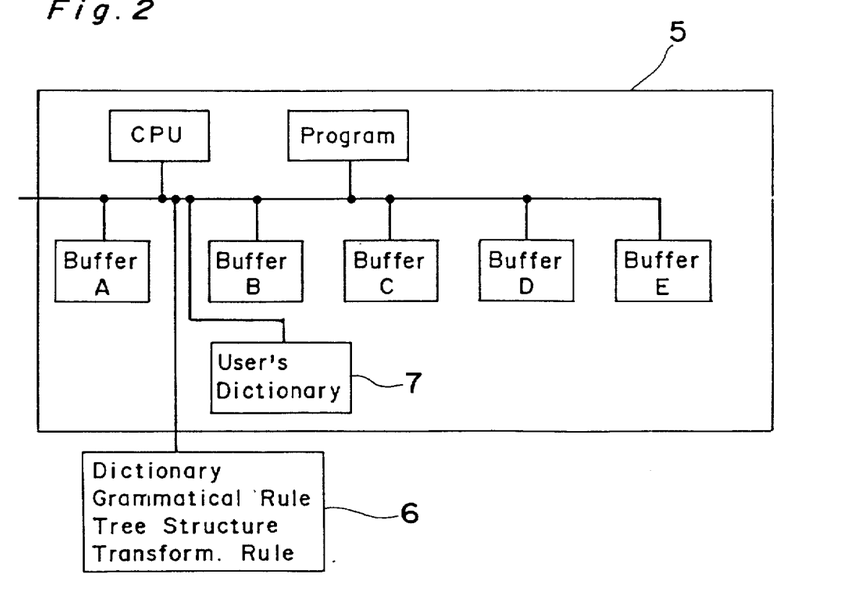
FIG. 2 is a more detailed block diagram of a translation module shown in FIG. 1.

FIG. 2 shows a preferred embodiment of the translation module 5. The module 5 provides five buffers A, B, C, D and E, and a table 6 including a dictionary for translation, grammatical rules and transformational rules for producing the so-called tree structure. As will be more fully explained below, data obtained at each level of analysis in the translation process are stored into these buffers A to E respectively according to the level of analysis.

As shown in FIG. 1 and FIG. 2, the translation module 5 further provides a user's dictionary 7 for registering source words together with equivalent words which are not contained in the ordinary dictionary of the system but necessary for the user to produce an accurate translation.

Below, the general principle employed in the machine translation process is explained.

Figure 3:
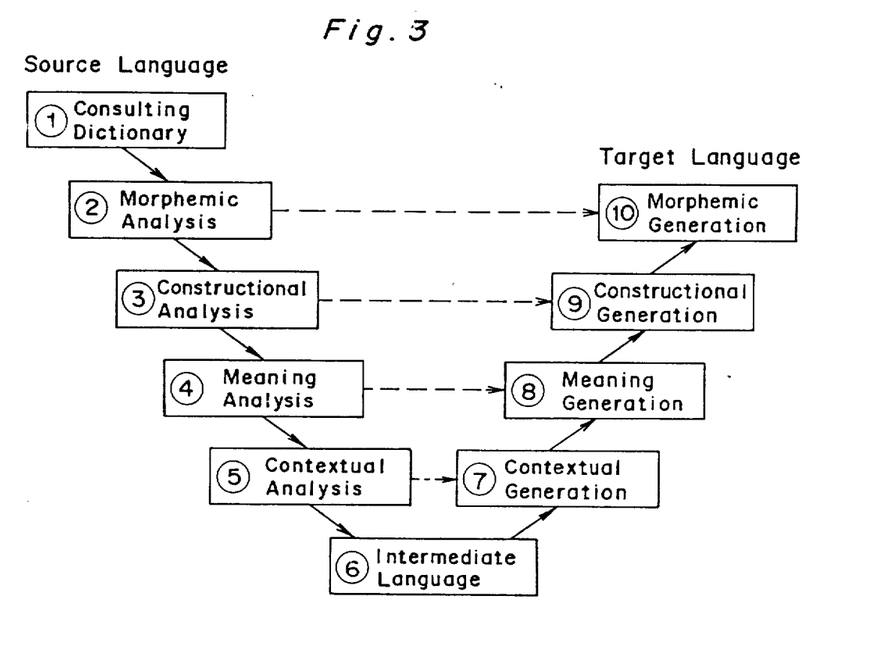
FIG. 3 is a schematical diagram for showing various methods used in the machine translation.

As shown in FIG. 3, there are provided many levels of analysis in a machine translation which are well known to those skilled in the art. When source language is entered, the analysis thereof sequentially consulting the dictionary (level #1), performing morphemic analysis (level #2) and constructional analysis (level #3). Machine translation methods are classified into two types according to the level at which the analysis is proceeded. One of these is the "Pivot Method" in which the analysis proceeds to the level #6 wherein the source language is transformed or translated into a an intermediate language constructed by the general translation process and being independent of either existing languages and, further, the target language is generated according to the intermediate language obtained. The other method is the "Transform Method" in which the analysis proceeds to either one level of morphemic analysis (#2), constructional analysis (#3), meaning analysis (#4) and contextual analysis (#5) to obtain the internal structure of the source language, and then, the target language is generated by transforming each structure obtained in each analysis level into structure of the level corresponding thereto represented or indicated in the target language.

In Table 1, each analysis-level in the translation process is listed.

TABLE 1

| Consulting Dictionary | To consult the dictionary provided for translation about each word entered. |
|---|---|
| Morphemic Analysis | To obtain grammatical data such as a part of speech and an equivalent about the word. To analyze the tense, the person and the number of the word. |
| Constructional Analysis | To determine the construction of a sentence such a subordination between or among words. |
| Structural Transformation | To transform an internal representation of a source sentence obtained by the constructional analysis into an internal representation of a target sentence. |
| Generation | To generate a target sentence from the internal representation thereof. |

According to the present invention, only the result obtained through the translation process is important irrespective of the level at which the analysis has been completed. In the present embodiment, the analysis is proceeded to level #3, the constructional analysis.

Figure 4:
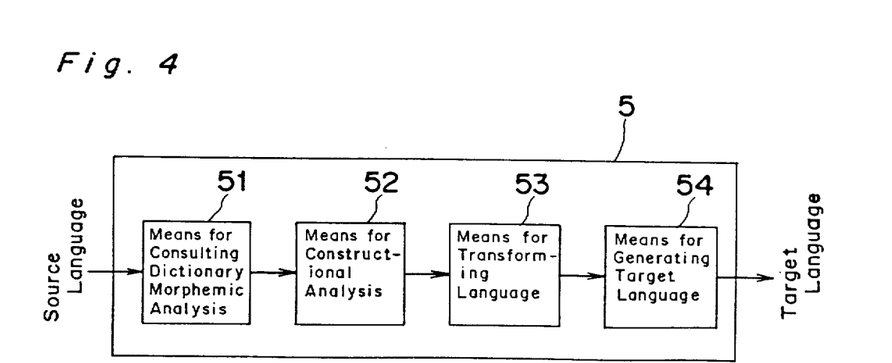
FIG. 4 is a block diagram showing functions of the translation module.
Figure 5:
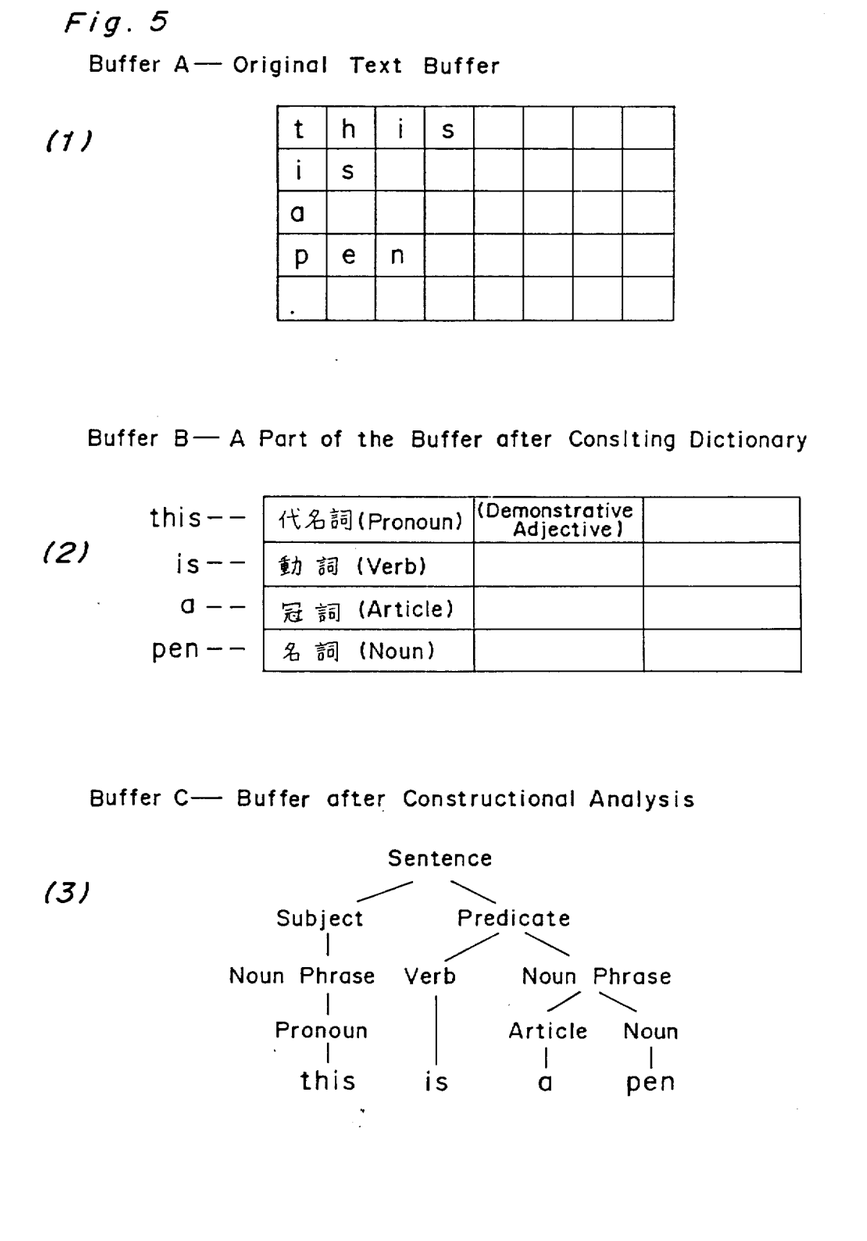

As shown in FIG. 4, the translation module 5 is functionally classified into means 51 for consulting with the dictionary and for analyzing morpheme, means 52 for analyzing construction, means 53 for transforming the source language to the target language and means 54 for generating the corresponding target language.

FIG. 5 shows the contents of each buffer, shown in FIG. 2, during the process of translating an English sentence "This is a pen." into Japanese as according to the present invention.

First, the original sentence is read into Buffer A as is shown in FIG. 5(1). The means 51 of the module 5 consults with the dictionary about each original word to obtain grammatical data and meanings corresponding to each word. These data obtained are entered into Buffer B as is shown partially in FIG. 5(2).

In FIG. 5(2), data regarding the corresponding part of speech shown. Although the word "this" has several different uses as a part of speech, the part of speech suitable for "this" in this sentence is identified to a specific one derived from the constructional analysis means 52 and the tree structure thereof is entered into Buffer C as shown in FIG. 5(3). In this process, an analysis as shown in Table 2 is made based upon the grammatical rules (phrase structure rules) stored in Table means 6.

TABLE 2

| Word Group | → | Constituents |
|---|---|---|
| Sentence | → | Subject, predicate |
| Subject | → | Noun Phrase |
| Predicate | → | Verb, Noun Phrase |
| Noun Phrase | → | Pronoun |
| Noun Phrase | → | Article, Noun |

This rule indicated by an arrow (→) means that, for instance, "Sentence consists of the subject and predicate.".

The language transform means 53 executes an analysis using transformation rules of tree structure similarly to the constructional analysis, and the result obtained is stored into Buffer D. The target language generating means 54 supplements one or more suitable post-positional words functioning as an auxiliary to a main word and one or more auxiliary verbs so as to form a Japanese sentence, and the result obtained is stored into Buffer E (Result Buffer) as shown in FIG. 5(5). This result is outputted from the translation module 5.

Figure 6:
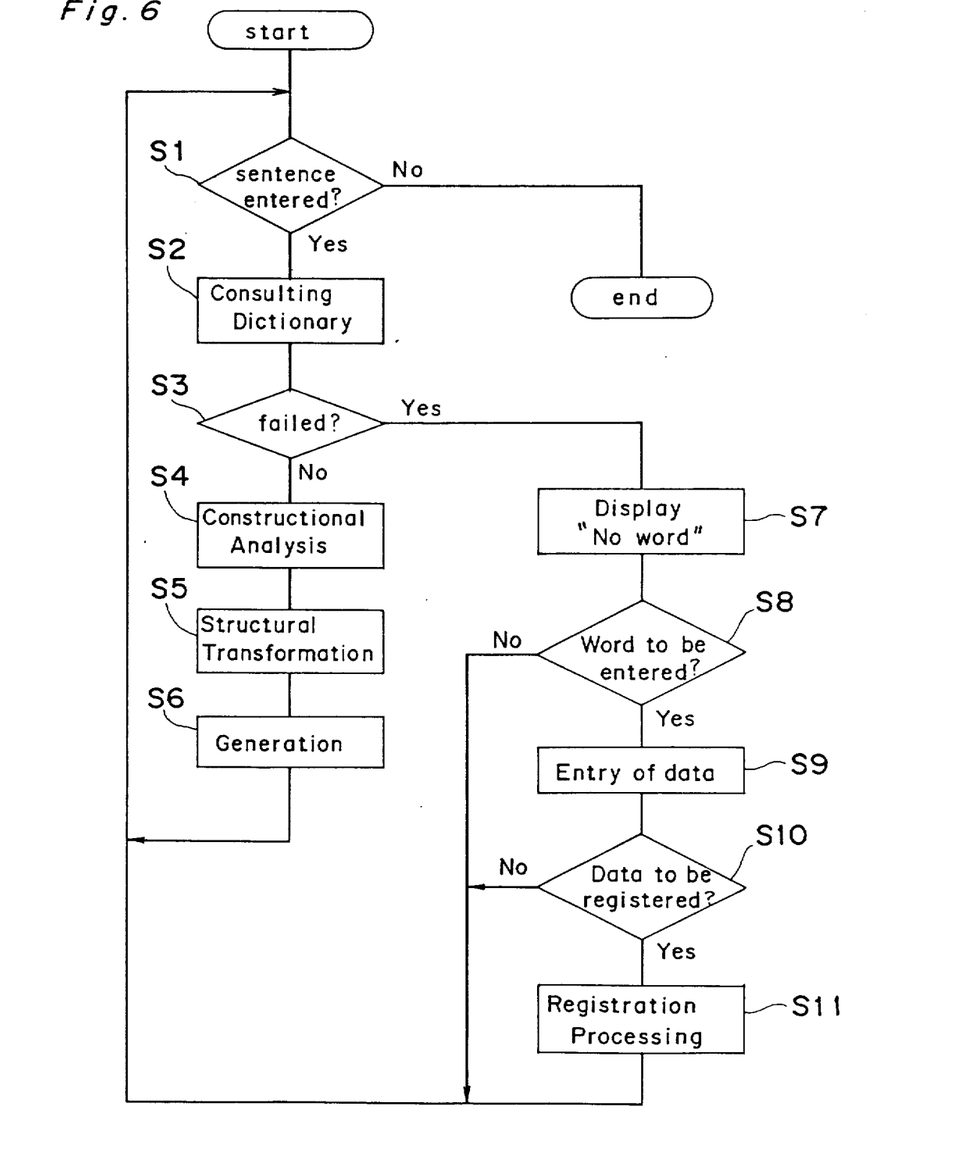
FIG. 6 is a flow chart showing the translation control process as executed by CPU of the translation machine.

FIG. 6 shows a flow chart of a main routine program according to the present invention.

When the translation process is started, it is checked at step S1 whether an original sentence has been entered into the buffer A of the translation module 5. If there is no sentence in the buffer A, the process is ended.

If there is a sentence in the buffer A, the process proceeds to step S2 in order to start a consultation with the dictionary. At step S3, it is checked whether the consultation is failed or not. If it is failed, the process proceeds to step S7.

Figure 8A:
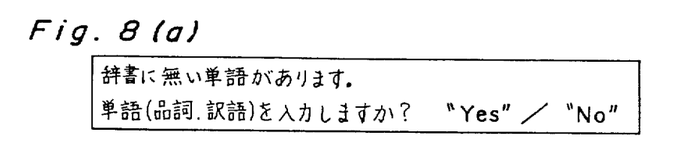
FIGS. 8(a), (b), (c), (d), (e) and (f) are illustration CRT displays given upon entering data into a user's dictionary.

At step S7, a message as shown in FIG. 8(a) is displayed in Japanese on CRT 3. The first indication informs the operator that there is no corresponding word in the dictionary, and the second message is an inquiry whether the word not contained in the dictionary should be registered in the user's dictionary or not. In other words, the operator is required to decide whether the part of speech and the target word equivalent to the word not contained in the ordinal dictionary are to be entered or not.

Figure 7:
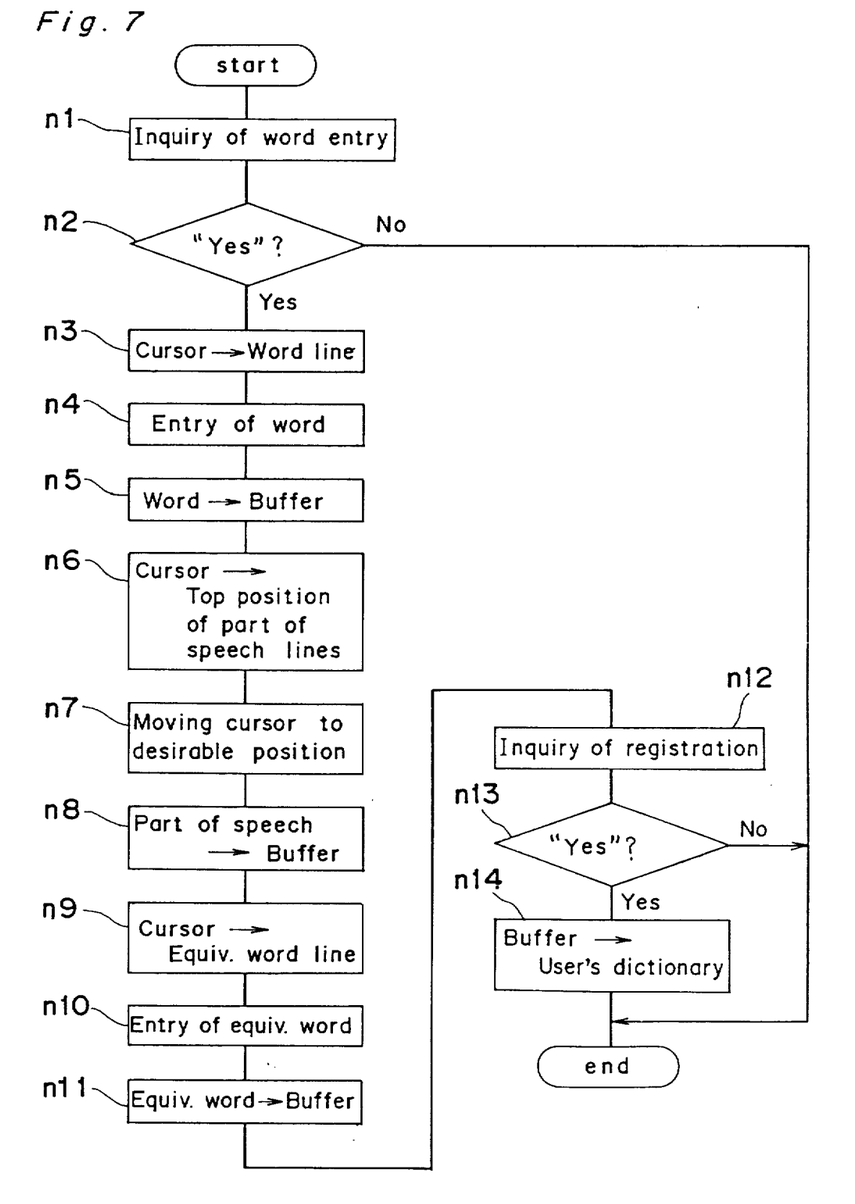
FIG. 7 is a flow chart showing the registration process for entering data into the user's dictionary.

Steps S7, S8, S9, S10 and S11 of FIG. 6 are shown more in detail in FIG. 7.

Next, the process proceeds to step S8 (step n1 of FIG. 7) in order for the operator to choose either the entry of word or the no-entry. If the failure in consulting dictionary is caused due to a misspelling, the operator designates "No" through the keyboard and pushes the Return key 4a. In this situation, the system deletes the instructions on the CRT 3 and the process returns from step S8 to step S1. Then, the operator enters a correct spelling through the keyboard 4. After entry of the correct spelling, the process skips to step S9, when the operator operates the "Yes" key (not shown), in order to start an entry process.

Figure 8B:
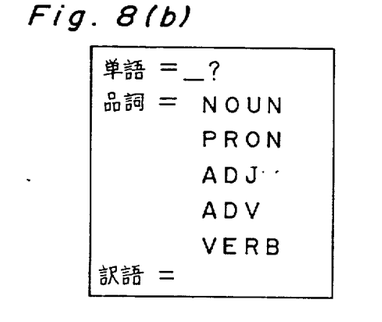
Figure 8C:
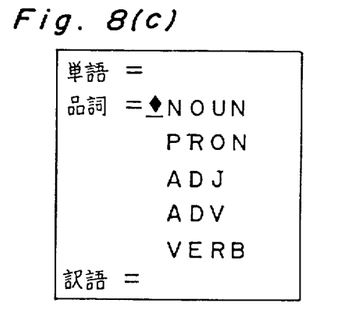

Referring now to FIG. 7, a method for entry processing will be explained. When the process skips to step S9 in FIG. 6, the process enters step n3 in FIG. 7. At step n3, the cursor is displayed automatically at a position shown in FIG. 8(b) from which a word to be registered can be entered. Therefore, the operator can enter the word directly without operating the cursor at step n4. When the Return-key 4a is operated after entry of the word, the process proceeds to step n5 and the word having been entered is stored in the buffer A. At step n6, the cursor is moved to a position of the top part of speech [NOUN] as shown in FIG. 8(c). At this stage, a rhombic mark is displayed at the position of the cursor to show the position of the cursor more clearly.

Next, the operator moves the cursor to a desirable position to designate the part of speech of the word entered and, then, operates the Return key 4a. If the part of speech indicated at the initial position of the cursor is to be designated, the operator operates only the Return key 4a to designate it. When the Return key 4a is operated at step n7, the process proceeds to step n8 to store the part of speech indicated by the cursor into the buffer. Then, the process proceeds to step n9 to display the cursor at a top position of the line for an equivalent word and the operator enters an equivalent Japanese word corresponding to the source word by operating the keyboard 4 at step n10.

Figure 8D:
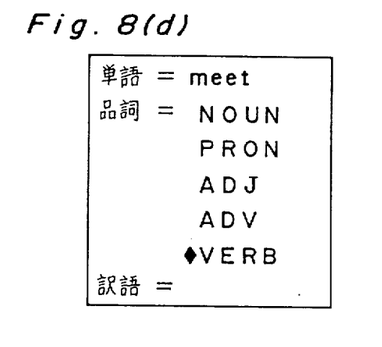
Figure 8E:
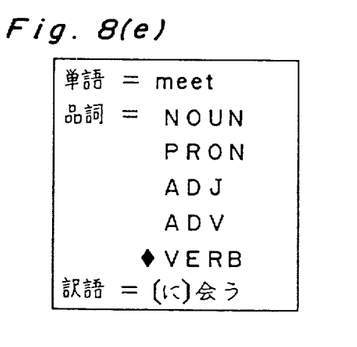

In this system, the operator can designate, if desired, a postpositional word proper or suitable to the equivalent Japanese word. This designation of the postpositional word can be done by bracketing it upon the entry thereof as shown in FIG. 8(e). If the source word is "meet" as shown in FIG. 8(d), the postpositional word "ni" is entered in a state bracketed together with the equivalent word "au", namely "[ni] au".

After the entry of the equivalent word and the postpositional word therefor, the operator operates the Return key 4a. When the Return key 4a is operated, the process proceeds to step n11 to store the equivalent word and the postpositional word in the buffer.

Figure 8F:
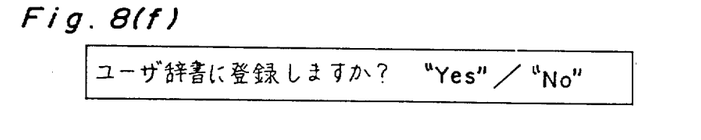

At step n12, an inquiry as to whether the data entered should be registered in the user's dictionary is displayed on CRT 3 as shown in FIG. 8(f).

If the operator indicates "Yes" at step n13, all data stored in the buffer are stored in the user's dictionary at step n14. This step n13 corresponds to step S10. If "No" is indicated, the process returns to the first step S1 without registering those data in order to continue the translation process. The step n14 of FIG. 7 corresponds to step S11 of FIG. 6. When the registration into the user's dictionary is completed, the process returns to step S1.

Thus, if a word having been entered is not contained in the dictionary provided from the first in the translation system, every user can enter data of the word such as a part of speech, an equivalent word and, if it is a verb or an auxiliary verb, a postpositional word to obtain a correct translation and, if desired, this data can be registered in the user's dictionary.

Returning now to FIG. 6, if all words have been consulted with those contained in the dictionary, the process proceeds from step S3 to step S4 to execute a constructional analysis of the sentence entered. Then, the process proceeds to step S5 to execute a constructional transformation and, then, to step S6 to generate a sentence translated into the target language.

Upon generation of the target sentence, it is checked whether a proper postpositional word is given for a verb or an auxiliary verb contained in the sentence.

Figure 9:
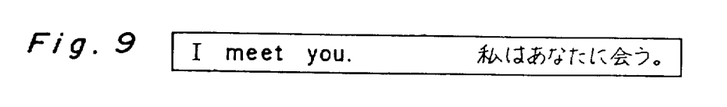
FIG. 9 is a display on CRT showing a source sentence and a correct translation thereof obtained according to the present invention.

Further, it is to be noted that brackets which were introduced for designating a postpositional word are deleted upon displaying the target sentence containing the correct one as shown in FIG. 9.

Figure 10:
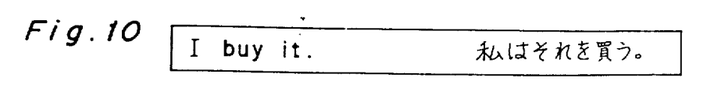
FIG. 10 is also a display on CRT showing a source sentence and a correct translation obtained when a postpositional word is not designated.

In such a case that a postpositional word is not designated upon the entry of data relating to a verb contained in the source sentence, a predetermined postpositional word, for example, "o" is given automatically. For example, if the verb to be registered in the user's dictionary is "buy", and a postpositional word is not designated, the predetermined postpositional word "o" is given to an equivalent Japanese "kau". This gives a correct Japanese sentence as shown in FIG. 10. This method makes the translation system much more convenient for the user since the operator need not designate a postpositional word for each of all verbs.

With respect to the user's dictionary 7, it is desirable that contents of the user's dictionary 7 can be referred to.

Figure 11:
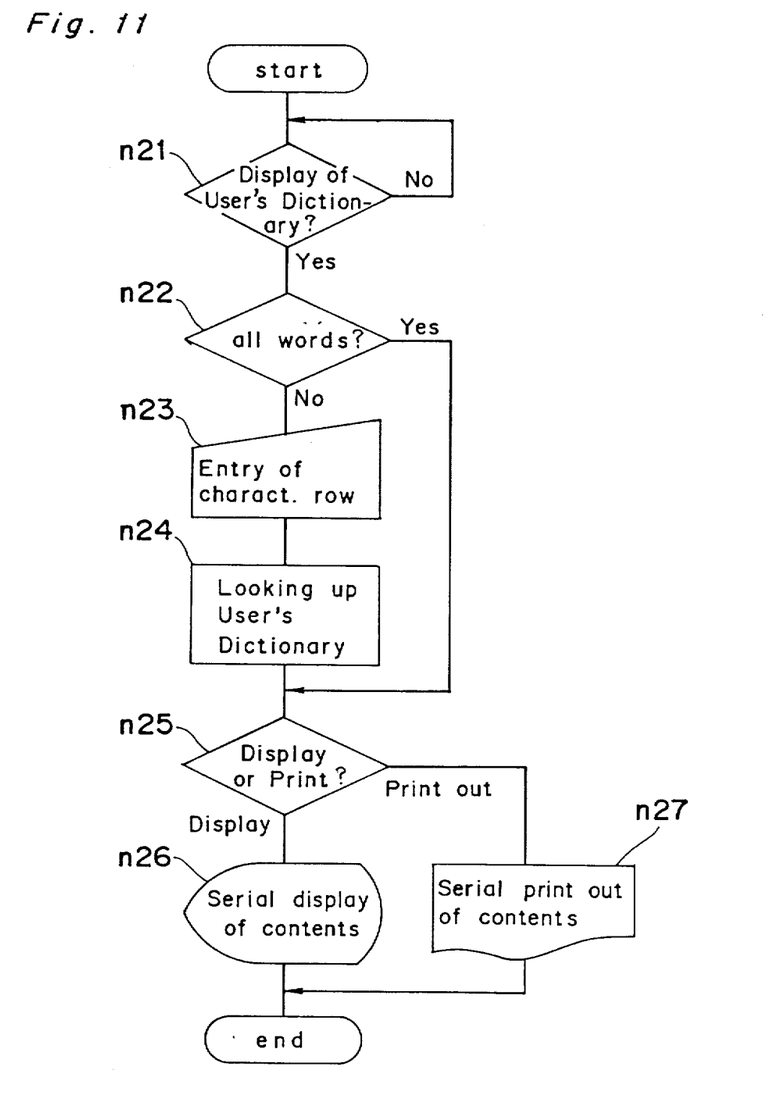
FIG. 11 is a flow chart of the process used for searching contents of the user's dictionary.

FIG. 11 shows a flow chart of a program for referring to contents of the user's dictionary 7. When the flow is started, it is checked at step n21 whether an indication for displaying or printing contents of the user's dictionary is made or not. At step n22, it is decided whether all words registered in the user's dictionary should be displayed or a word designated by an operator should be displayed. If the display of all words is chosen, the process proceeds to step n25.

If the display of a designated word is chosen, the process proceeds to step n23. When the word designated or character row of a head portion of the word is entered, the word is referenced in the user's dictionary at step n24. The word is referenced by referring to the entered character row of the head portion. If the word is found out in the user's dictionary, the process proceeds to step n25. When the display mode is selected at step n25, the process proceeds to step n26 to display contents of the word on the CRT display. If the print mode is selected, the process proceeds from step n25 to step n27 to print out contents of the word by the printer.

When the all word mode is chosen at step n22, the entire contents of the user's dictionary are displayed or printed out. In this mode, it is desirable to output data in alphabetic order of entry words.

According to this preferred embodiment of a translation system, the following advantages can be obtained:

(a) an operator can select a user's dictionary most suitable for the sentences to be translated among a plurality of user's dictionaries since whole contents of individual dictionaries can be looked up, (b) an operator can easily search whether a word has been registered in a user's dictionary, (c) an operator can look up contents of a word having been registered in a user's dictionary in order to check if those data are correct or not.

(d) an operator can check whether unnecessary words have been registered in the user's dictionary.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included as within the scope of the following claims.

What is claimed is:

1. A translation system for translating inputted sentences from a first language to a second language comprising:

dictionary memory means for storing a plurality of reference data corresponding to particular words in said first language, said reference data including the part of speech and equivalent word in said second language;

memory means for storing inputted sentences in said first language;

input means in communication with said memory means for inputting a sentence in said first language;

designation means connected to said dictionary means and responsive to said input means for designating a postpositional word in said second language and for storing said postpositional word as part of said reference data in said dictionary memory means; and translation means using said reference data stored in said dictionary means for translating an inputted sentence from said first language to said second language.

2. A translation system as recited in claim 1, further comprising:

second memory means for storing a preselected postpositional word in said second language;

detection means for detecting whether a postpositional word has been designated as part of said reference data; and insert means responsive to said detection means for inserting said preselected postpositional word in said translation where no designated postpositional word is detected by said detection means.

* * * * *